(12) United States Patent
Okuyama

(10) Patent No.: US 7,614,031 B2
(45) Date of Patent: Nov. 3, 2009

(54) DRAWING APPARATUS WITH DRAWING DATA CORRECTION FUNCTION

(75) Inventor: Takashi Okuyama, Saitama (JP)

(73) Assignee: ORC Manufacturing Co., Ltd., Tokyo (JP)

( * ) Notice: Subject to any disclaimer, the term of this patent is extended or adjusted under 35 U.S.C. 154(b) by 391 days.

(21) Appl. No.: 11/396,704

(22) Filed: Apr. 4, 2006

(65) Prior Publication Data

US 2006/0233457 A1  Oct. 19, 2006

(30) Foreign Application Priority Data

Apr. 19, 2005  (JP)  ............................... 2005-120756

(51) Int. Cl.
G06F 17/50 (2006.01)

(52) U.S. Cl. ............................ 716/19; 716/20; 716/21; 382/144; 430/5; 430/30

(58) Field of Classification Search ............. 716/19–21; 382/144; 430/5, 30
See application file for complete search history.

(56) References Cited

U.S. PATENT DOCUMENTS

| | | | | |
|---|---|---|---|---|
| 4,577,945 | A | * | 3/1986 | Shimazaki .................. 353/101 |
| 4,908,656 | A | * | 3/1990 | Suwa et al. ................... 355/53 |
| 5,345,310 | A | * | 9/1994 | Rostoker et al. ............ 356/401 |
| 5,834,785 | A | * | 11/1998 | Coon ...................... 250/492.2 |
| 5,943,588 | A | * | 8/1999 | Watrobski et al. ........... 438/401 |
| 6,100,915 | A | * | 8/2000 | Iwasaki et al. .............. 347/249 |
| 6,235,438 | B1 | * | 5/2001 | Suzuki et al. ................ 430/30 |
| 6,424,879 | B1 | * | 7/2002 | Chilese et al. .............. 700/121 |
| 6,552,775 | B1 | * | 4/2003 | Yanagihara et al. ........... 355/55 |
| 6,677,088 | B2 | * | 1/2004 | Magome et al. ................ 430/5 |
| 6,753,948 | B2 | * | 6/2004 | Taniguchi ..................... 355/71 |
| 6,886,154 | B2 | | 4/2005 | Okuyama |
| 2002/0187406 | A1 | * | 12/2002 | Magome et al. ................ 430/5 |
| 2003/0001798 | A1 | | 1/2003 | Okuyama |
| 2003/0011860 | A1 | | 1/2003 | Okuyama et al. |
| 2003/0031365 | A1 | * | 2/2003 | Okuyama ................... 382/194 |
| 2003/0035090 | A1 | * | 2/2003 | Imai et al. ..................... 355/53 |
| 2005/0052464 | A1 | | 3/2005 | Okuyama |
| 2005/0122495 | A1 | * | 6/2005 | Kaplan et al. ................. 355/52 |
| 2006/0204073 | A1 | * | 9/2006 | Ghinovker et al. .......... 382/144 |

FOREIGN PATENT DOCUMENTS

JP  2003-57836  2/2003

OTHER PUBLICATIONS

English language Abstract of JP 2003-57836.

* cited by examiner

*Primary Examiner*—Naum B Levin
(74) *Attorney, Agent, or Firm*—Greenblum & Bernstein, P.L.C.

(57) ABSTRACT

A data correcting apparatus is for correcting drawing data representing a drawing pattern included in a quadrangular drawing area of a drawing subject. The correction process is based on an ideal position and an actual position of the drawing area on the drawing subject. An actual outline is an outline of the drawing area in the actual position, and an ideal outline is an outline of the drawing area in the ideal position. The data correcting apparatus includes a first data corrector that corrects the drawing data to be first corrected drawing data. A first corrected outline is an outline of the drawing area represented by the first corrected drawing data, and is a parallelogram which has two neighboring sides that are the same as the sides of the actual outline. Further, the parallelogram has a shape closer to that of the ideal outline than the actual outline.

16 Claims, 12 Drawing Sheets

DRAWING APPARATUS WITH DRAWING DATA CORRECTION FUNCTION

BACKGROUND OF THE INVENTION

1. Field of the Invention

The present invention relates to a drawing apparatus which has a drawing data correcting function, the drawing data representing a pattern to be drawn.

2. Description of the Related Art

When drawing patterns on a substrate, patterns should be drawn at a predetermined position. However, a substrate can be slightly transformed due to heating processes and so on, and the actual position of the drawn pattern can shift from an ideal position. Therefore, generally, marks for determining pattern position are previously provided at predetermined positions, such as the corner of the substrate. Then, distances of the marks before and after the transformation of the substrate are measured, and the drawing data is corrected based on the distances of the marks.

In drawing data correction operations, generally, correction processes are carried out for the original drawing data representing circuit patterns which should be drawn, so that the original drawing data becomes corrected drawing data representing circuit patterns that are enlarged, reduced, rotated or moved parallel to the original position, and so on.

In a case where the transformation of a substrate is complex, the above mentioned data correction operations, such as for enlargement or reduction of the circuit patterns, and position change of the circuit patterns, based on the distances of the marks, are not accurate enough for pattern drawing.

SUMMARY OF THE INVENTION

Therefore, an objective of the present invention is to provide a drawing apparatus which can correct drawing data accurately, in accordance with a complex transformation of a substrate on which patterns are drawn.

A data correcting apparatus according to the present invention, is for correcting drawing data representing a drawing pattern to be drawn in a quadrangular drawing area of a drawing subject, based on an ideal position and an actual position of the drawing area on the drawing subject. An actual outline is an outline of the drawing area in the actual position, and an ideal outline is an outline of the drawing area in the ideal position. The data correcting apparatus includes a first data corrector that corrects the drawing data to be first corrected drawing data. A first corrected outline is an outline of the drawing area represented by the first corrected drawing data and is a parallelogram which has two neighboring sides that are the same as two neighboring sides of the actual outline. The parallelogram has a shape closer to that of the ideal outline than the actual outline.

A drawing apparatus according to the present invention, includes a data corrector and a pattern drawer. The data corrector is for correcting drawing data representing a drawing pattern to be drawn in a quadrangular drawing area of a drawing subject, based on an ideal position and an actual position of the drawing area on the drawing subject. An actual outline is an outline of the drawing area in the actual position, and an ideal outline is an outline of the drawing area in the ideal position. The data corrector corrects the drawing data to be corrected drawing data. A corrected outline is an outline of the drawing area represented by the corrected drawing data and is a parallelogram which has two neighboring sides that are the same as two neighboring sides of the actual outline. The parallelogram has a shape closer to that of the ideal outline than the actual outline. The pattern drawer draws the drawing pattern based on the corrected drawing data.

A drawing data correcting method according to the present invention, is for correcting drawing data representing a drawing pattern to be drawn in a quadrangular drawing area of a drawing subject, based on an ideal position and an actual position of the drawing area on the drawing subject. An actual outline is an outline of the drawing area in the actual position. An ideal outline is an outline of the drawing area in the ideal position. The drawing data correcting method includes a data correcting step in which the drawing data is corrected to be corrected drawing data. A corrected outline is an outline of the drawing area represented by the corrected drawing data, and is a parallelogram which has two neighboring sides that are the same as two neighboring sides of the actual outline. The parallelogram has a shape closer to that of the ideal outline than the actual outline.

A computer program product according to the present invention, is for correcting drawing data representing a drawing pattern to be drawn in a quadrangular drawing area of a drawing subject, based on an ideal position and an actual position of the drawing area on the drawing subject. An actual outline is an outline of the drawing area in the actual position. An ideal outline is an outline of the drawing area in the ideal position. The computer program includes a data corrector that corrects the drawing data to be corrected drawing data. A corrected outline is an outline of the drawing area represented by the corrected drawing data, and is a parallelogram which has two neighboring sides that are the same as two neighboring sides of the actual outline. The parallelogram has a shape closer to that of an ideal outline than the actual outline.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENT

Hereinafter, the preferred embodiment of the present invention is described with reference to the attached drawings.

Figure 1:
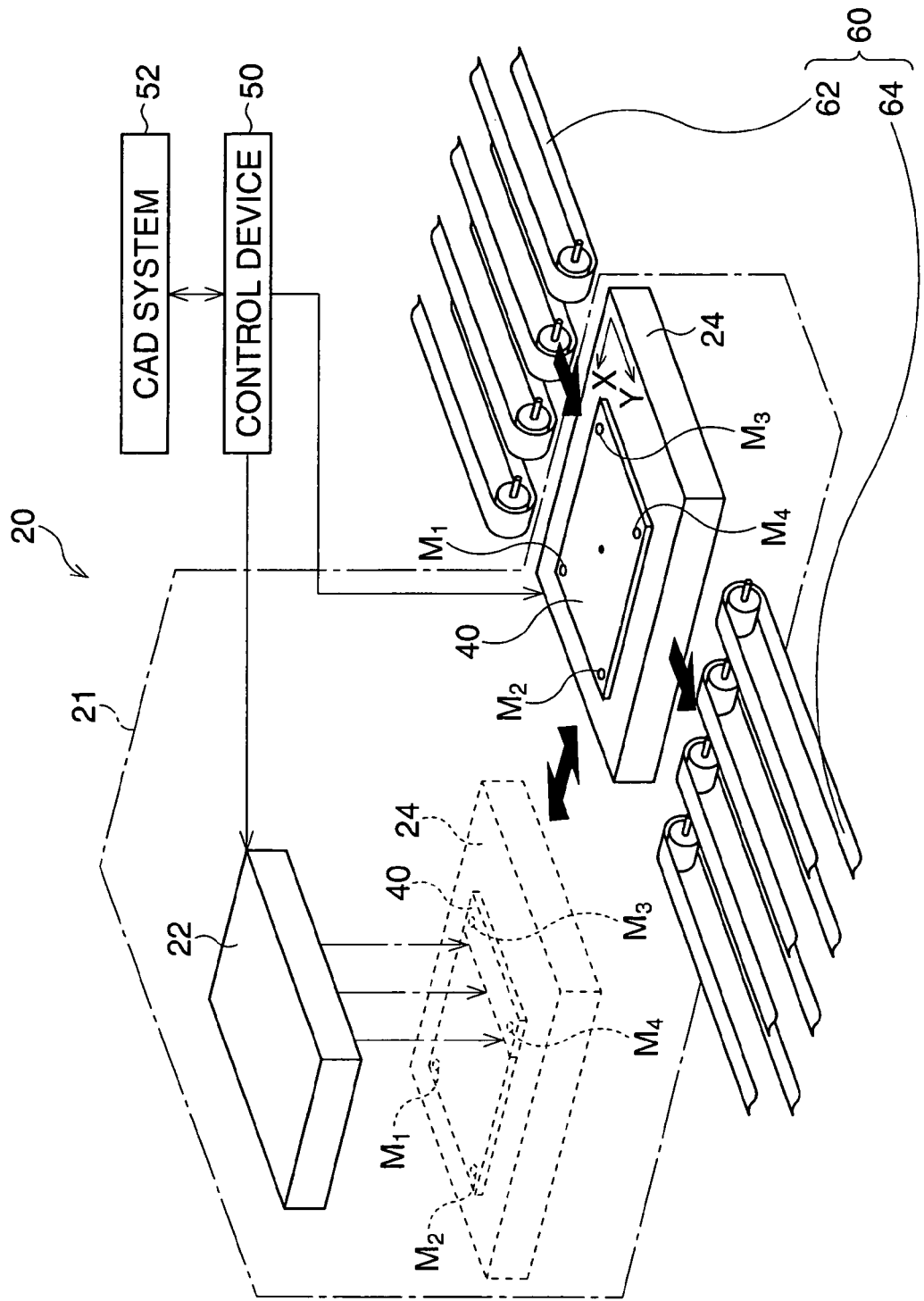
FIG. 1 is a perspective view conceptually representing a drawing apparatus of an embodiment of the present invention.

As shown in FIG. 1, the drawing apparatus 20 includes a laser drawing device 21 for directly drawing patters on a photosensitive substrate 40 by a laser beam. The laser drawing device 21 has an optical unit 22 and a drawing table 24 on which the substrate 40 is placed. The drawing apparatus 20 has a carrying device 60 including a carry-in belt 62 for carrying the substrate 40 onto the drawing table 24, and a carry-out belt 64 for carrying the substrate 40 on which patterns have been drawn to another processing apparatus (not shown).

The optical unit 22 includes a laser light source and an optical system (not shown), and emits a laser beam along a main scanning direction, to the substrate 40. Here, a two-dimensional drawing-coordinate-system is defined as having a Y-axis which is parallel to the main scanning direction of the optical unit 22, an X-axis which is parallel to the sub scanning direction of the optical unit 22, and an origin at a predetermined position on the drawing table 24.

The drawing apparatus 20 includes a control device 50 which controls all of the processes of the laser drawing device 21, the drawing table 24, and so on. The control device 50 is a micro computer that includes a memory device such as a ROM or a RAM, and is connected to a CAD system 52. Drawing data generated by the CAD system 52, representing positions and shapes of the circuit patterns to be drawn, is transferred to the control device 50. The drawing data is stored in a memory (not shown) in the control device 50, and transferred to the optical unit 22 after predetermined processes are carried out.

On a surface of the substrate 40, first to fourth alignment marks $M_1$ to $M_4$ for defining a drawing area in which patterns are drawn, are provided. The drawing area is surrounded by the sides of connecting neighboring alignment marks of the first to fourth alignment marks $M_1$ to $M_4$, and is square. In the drawing data, data is included that represents ideal positions of the first to fourth alignment marks $M_1$ to $M_4$ on the substrate 40. The ideal positions are the positions of the first to fourth alignment marks $M_1$ to $M_4$ when no transformation has occurred in the substrate 40. The control device 50 corrects the drawing data for correcting the positions and shapes of the patterns to be drawn, based on the ideal positions of the first to fourth alignment marks $M_1$ to $M_4$ represented by the original drawing data, and the actual positions of the first to fourth alignment marks $M_1$ to $M_4$ on the substrate 40 which is slightly transformed, as explained below.

The drawing table 24 can move along the X-axis direction by an operation of a motor (not shown) controlled by the control device 50, between a preparation position for the substrate 40 that is to be drawn on, shown by the solid lines, and a drawing position for drawing by the optical unit 22, shown by the dashed lines. When the substrate 40 is placed on the drawing table 24 in the preparation position, the drawing table 24 moves to the drawing position. Further, the drawing table 24 gradually moves towards a negative direction of the X-axis, that is from the drawing position to the preparation position. During this movement, the substrate 40 is drawn on by the optical unit 22. At this time, laser beams used for drawing the substrate 40 are modulated by the optical unit 22 for scanning along the Y-axis direction, and the pattern is gradually drawn.

Figure 2:
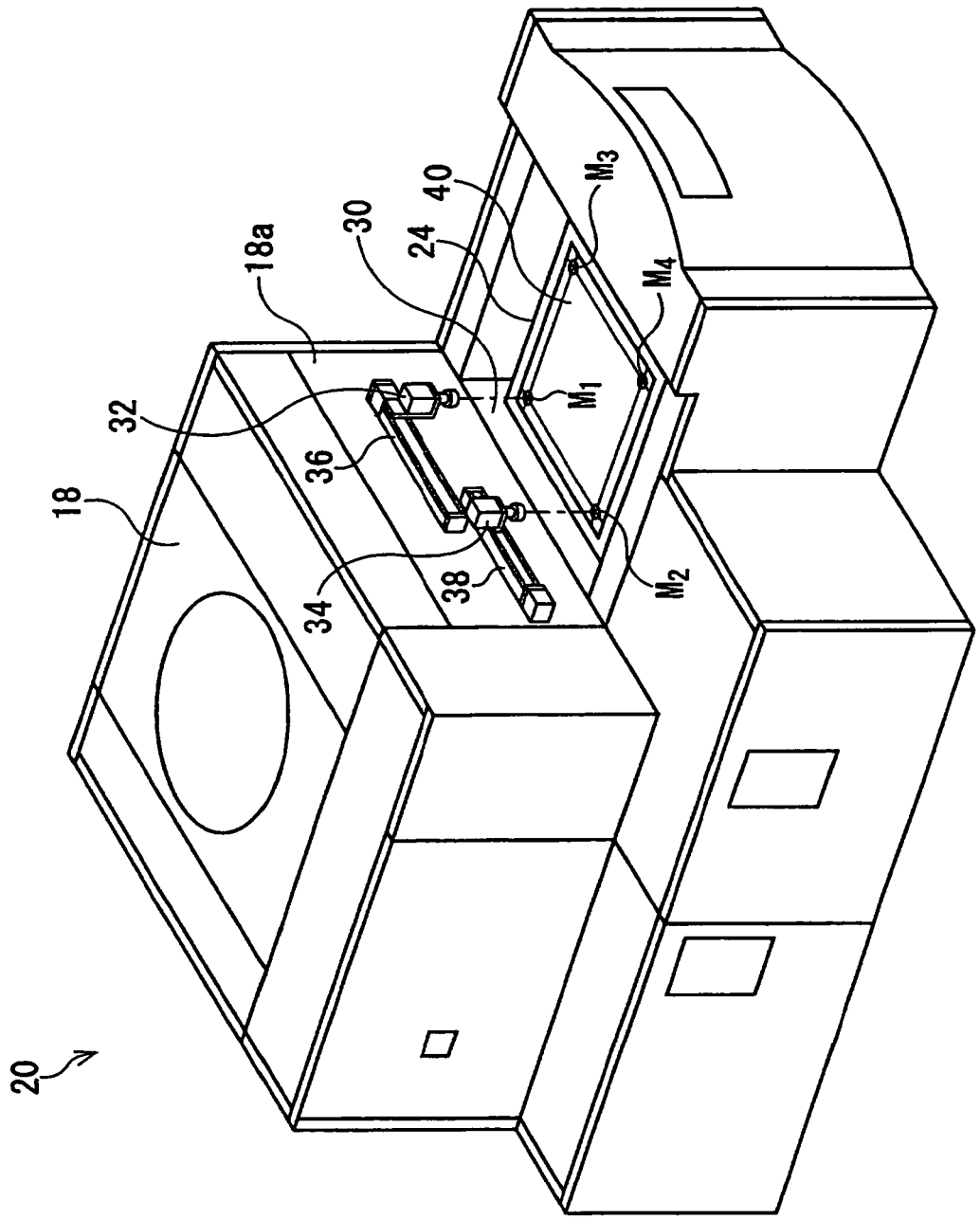
FIG. 2 is a perspective view representing an outside of the drawing apparatus.

As shown in FIG. 2, a housing 18 is provided for covering the optical unit 22. In a side surface 18a of the housing 18, an opening 30 is provided, and the drawing table 24 goes in and out of the housing 18 through the opening 30. On the side surface 18a, a first rail 36 and a second rail 38 running almost along the Y-axis are provided. A first CCD camera 32 and a second CCD camera 34 are respectively attached to the first rail 36 and the second rail 38. The first and second CCD cameras 32 and 34 are moved on the first and second rails 36 and 38 by linear motors driven based on commands from the control device 50, and photograph the first to fourth alignment marks $M_1$ to $M_4$ for detecting the actual positions thereof, before drawing.

Information on the actual positions of the first to fourth alignment marks $M_1$ to $M_4$ which are detected by the first and second CCD cameras 32 and 34, is transferred to the control device 50. The control device 50 generates mark position data representing the actual positions of the first to fourth alignment marks $M_1$ to $M_4$ in the drawing-coordinate-system based on the transferred information, as explained below. Further, the control device 50 corrects the drawing data stored in the memory based on the mark position data, so that the drawing data becomes corrected drawing data. The optical unit 22 draws predetermined patterns on the surface of the substrate 40 based on the corrected drawing data, under the control of the control device 50.

Figure 3:
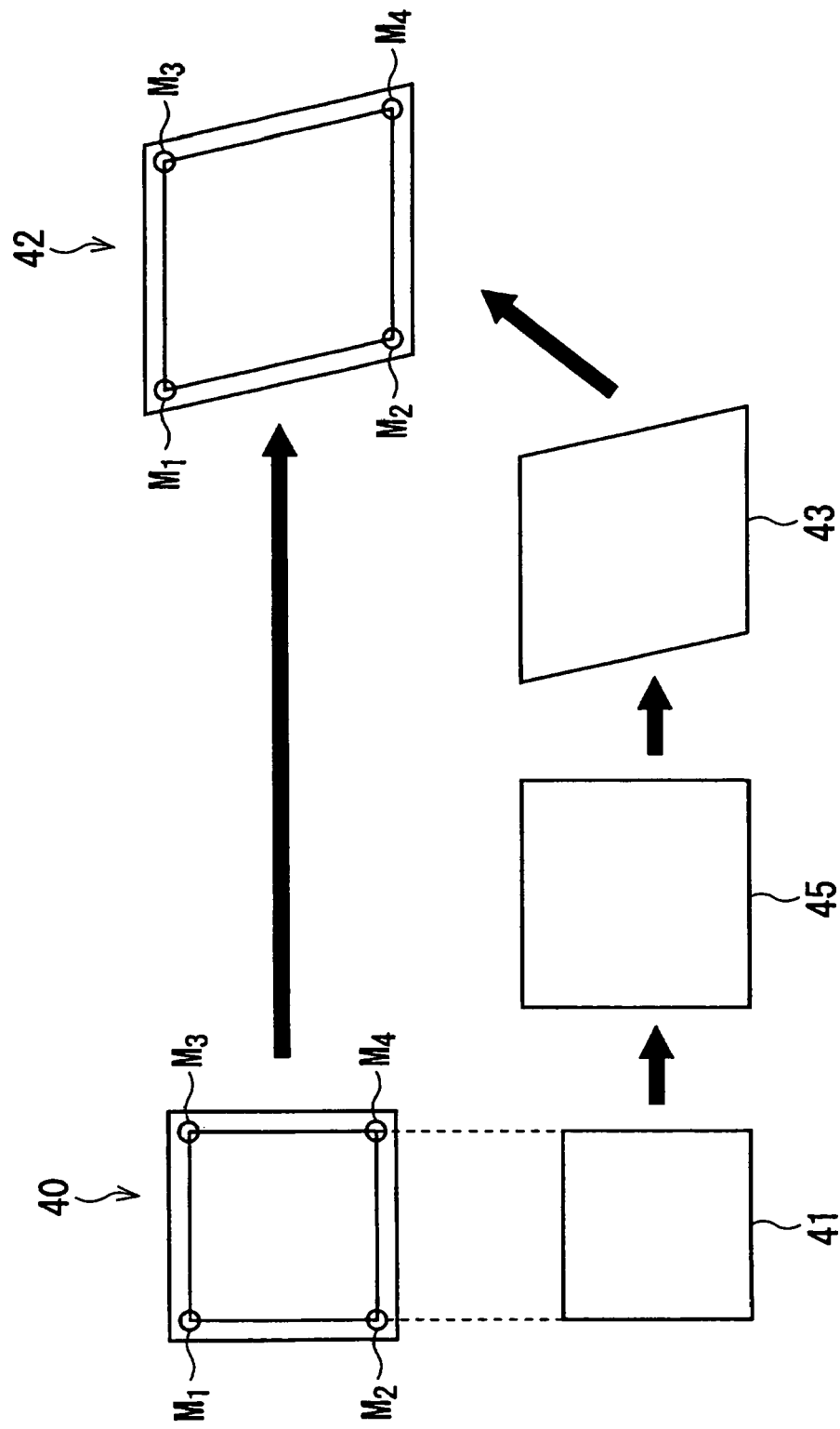
FIG. 3 is a conceptual view representing a comparative example of correcting drawing data in accordance with the transformation of a substrate.
Figure 4:
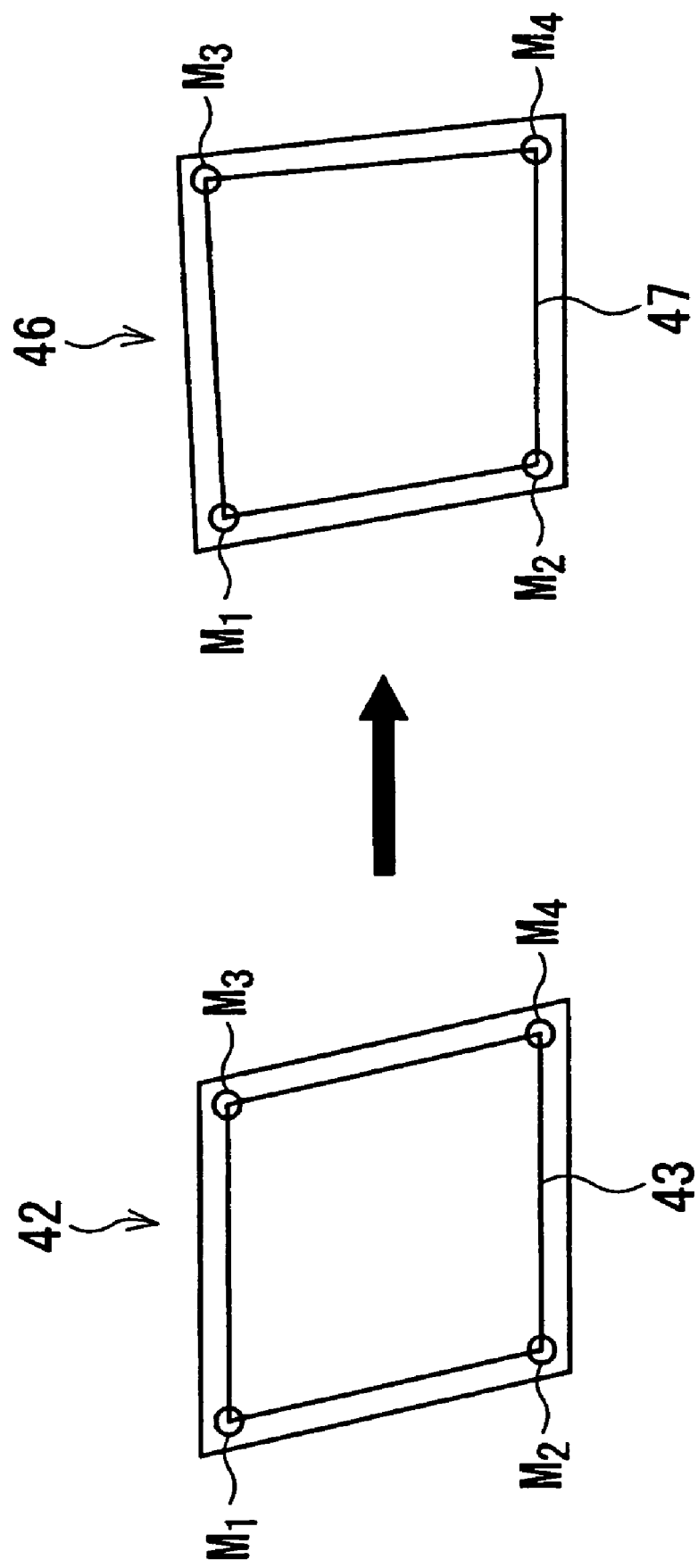
FIG. 4 is a conceptual view representing a step in the process for correcting drawing data.
Figure 5:
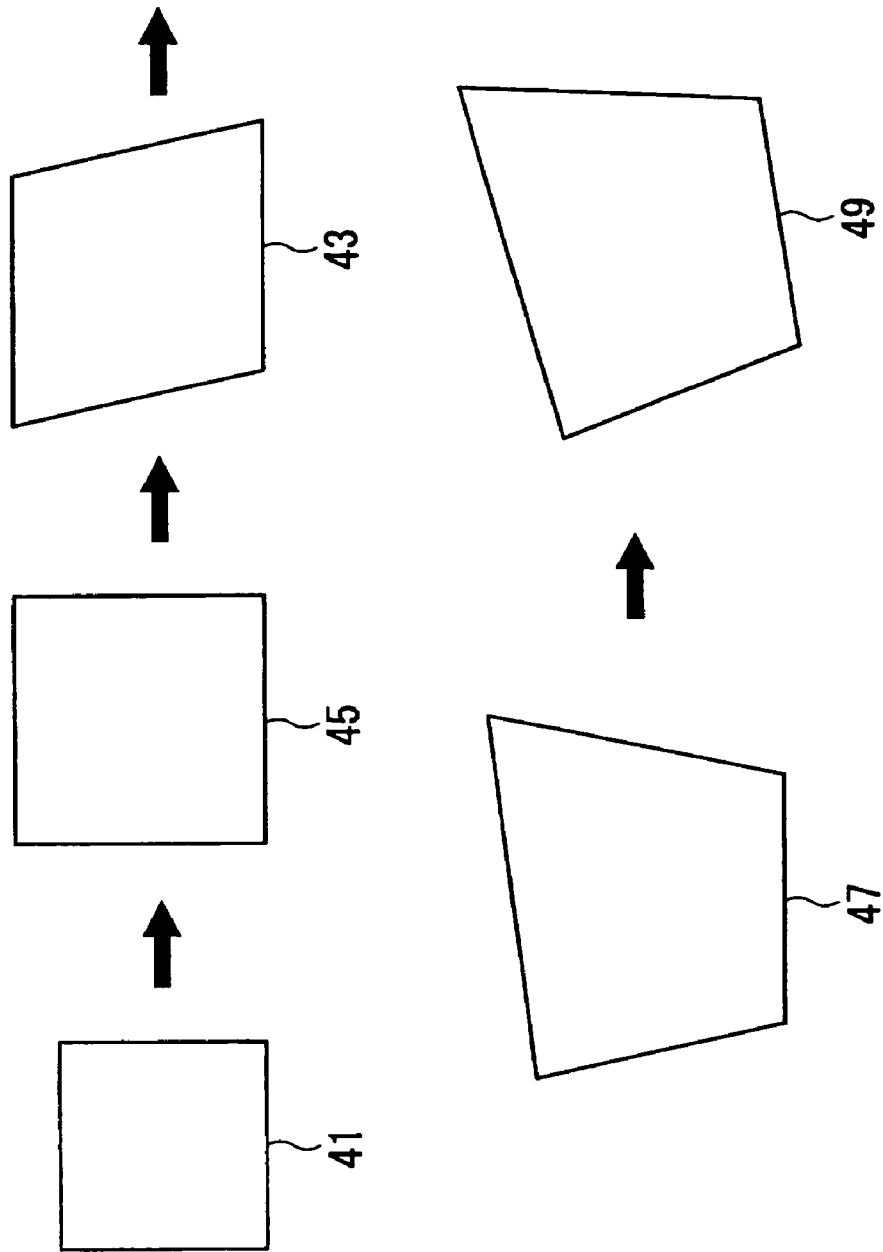
FIG. 5 is a conceptual view representing all steps in the process for correcting drawing data.

In FIG. 3, a comparative example for correcting drawing data is represented, and in FIGS. 4 and 5, steps for correcting drawing data are represented. Note that in the figures following FIG. 3, the transformation of the substrate 40 is exaggerated for explanation. In fact, the actual amount of transformation is small.

An ideal drawing area 41, surrounded by the sides connecting neighboring alignment marks of the first to fourth alignment marks $M_1$ to $M_4$ on the substrate 40 without any transformation, is square. However, the substrate 40 may be slightly transformed by the heating process and so on, to be a first transformed substrate 42. In the first transformed substrate 42, the positions of the first to fourth alignment marks $M_1$ to $M_4$ are shifted, therefore, a first transformed drawing area 43, that is an area surrounded by the sides connecting neighboring alignment marks of the first to fourth alignment marks $M_1$ to $M_4$ on the first transformed substrate 42, is a parallelogram in this comparative example.

The drawing data representing positions and shapes of the circuit pattern to be drawn on the ideal drawing area 41, are corrected to become drawing data corresponding to the first transformed drawing area 43. That is, at the first step, the drawing data is corrected by using a scaling correction method, to become drawing data corresponding to a scale changed drawing area 45 that has longer or shorter sides compared to those of the ideal drawing area 41, and has a rectangular shape. The data corresponding to the scale changed drawing area 45, is further corrected to correspond to the first transformed drawing area 43, by using a sloping correction method where one pair of opposite sides of the outline of the scale changed drawing area 45 is set at an angle relative to another pair of opposite sides, forming a parallelogram. And then, patterns whose positions and shapes are corrected, are drawn inside the first transformed drawing area 43.

However, when the transformation of the substrate 40 is complex, for example, when the position of the third alignment mark $M_3$ is different from that of the first transformed substrate 42, a second transformed substrate 46 can be generated. In this case, a second transformed drawing area 47, surrounded by the sides connecting neighboring alignment marks $M_1$ to $M_4$, is not a parallelogram, but only a quadrangle (see FIG. 4). Therefore, a further correction method for correcting the drawing data corresponding to the first transformed drawing area 43, is necessary. This is because the original drawing data can not be corrected to correspond to the second transformed drawing area 47 by using only the scaling and sloping correction methods explained above.

Therefore, in this embodiment, first corrected drawing data which corresponds to the first transformed drawing area 43 is generated based on the quadrangular second transformed drawing area 47, and further, second corrected drawing data corresponding to the quadrangular second transformed drawing area 47 is generated, by using the gradual scaling correction method described below. That is, first, the original drawing data for drawing patterns in the ideal drawing area 41 is converted to the first corrected drawing data corresponding to the first transformed drawing area 43 (see FIG. 5), by the scaling correction and the sloping correction methods in the control device.

Next, second corrected drawing data for drawing patterns in the second transformed drawing area 47, is generated by the gradual scaling correction method. Note that the second transformed drawing area 47 is a quadrangle which has sides connecting neighboring alignment marks of the first to fourth alignment marks $M_1$ to $M_4$, and which has the same shape as the below explained quadrangle 49 having sides connecting neighboring alignment marks $M_1$ to $M_4$ in the actual positions, represented by images photographed by the first and second CCD cameras 32 and 34.

In the embodiment, to easily explain the processes for correcting the original drawing data to corrected drawing data, first, the operational process for making the second transformed drawing area 47 for the second transformed substrate 46 (see FIG. 4), correspond to the ideal drawing area 41 is explained below. In the control device 50, actually, the original drawing data for drawing patterns in the ideal drawing area 41 is corrected, and the corrected drawing data for drawing patterns almost similar to the patterns represented by the original drawing data, in the second transformed drawing area 47, is generated by the backward calculation for the below-explained operational process for converting the second transformed drawing area 47 into the ideal drawing area 41.

Figure 6:
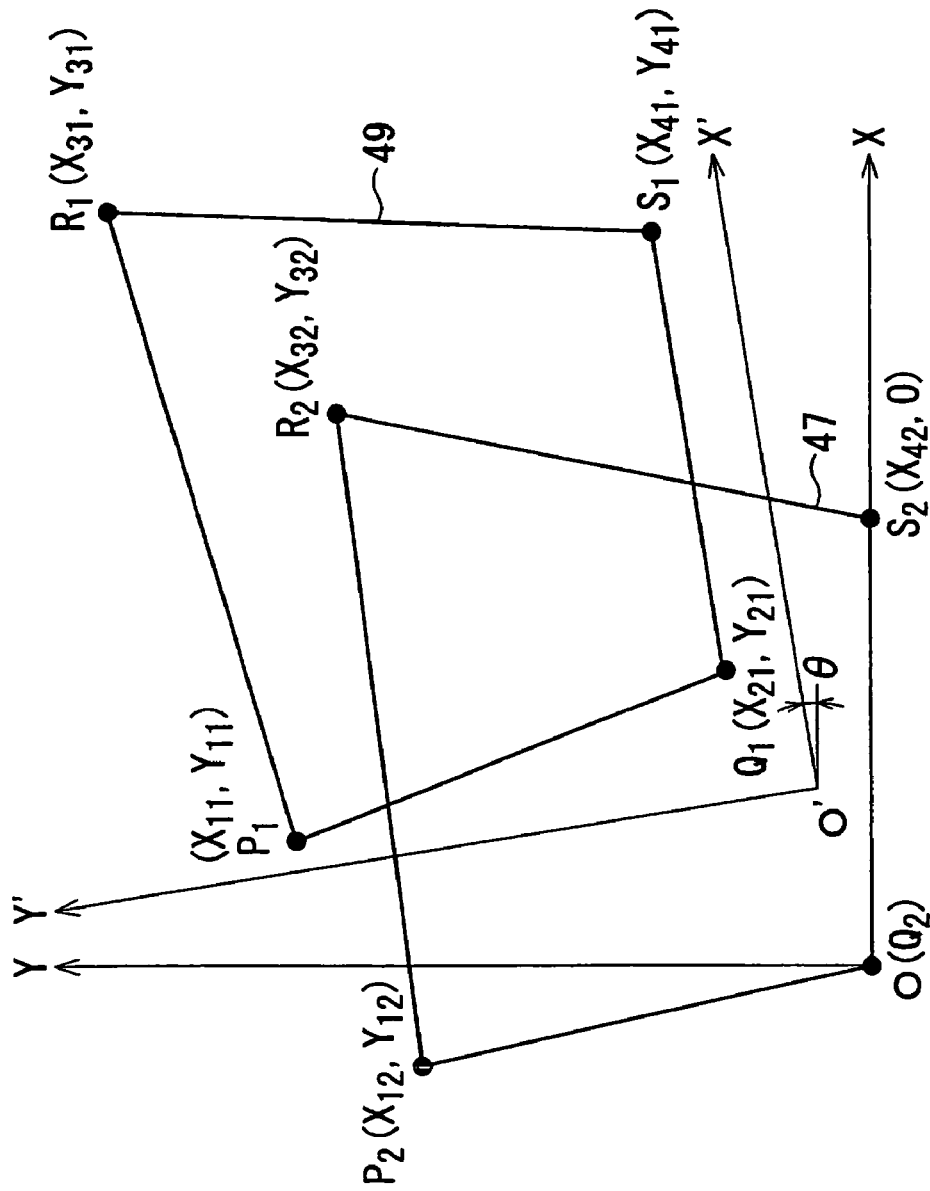
FIG. 6 is a conceptual view representing the generation of mark position data.

As shown in FIG. 6, the mark position data is generated based on the actual positions of the first to fourth alignment marks $M_1$ to $M_4$ in a coordinate-system of the first and second CCD cameras 32 and 34 (hereinafter a photographing-coordinate-system).

The coordinate system values of points $P_2$, $Q_2$, $R_2$, and $S_2$ representing vertexes of the second transformed drawing area 47 in the drawing-coordinate-system, are calculated by coordinate conversion of the coordinate system values of points $P_1$, $Q_1$, $R_1$, and $S_1$ representing the positions of the first to fourth alignment marks $M_1$ to $M_4$ in the photographing-coordinate-system. Due to the coordinate conversion from the photographing-coordinate-system to the drawing-coordinate-system, including the rotation shift and parallel shift of the photographing-coordinate-system, all points included in the quadrangle 49 surrounded by the sides connecting neighboring alignment marks $M_1$ to $M_4$ in the photographing-coordinate-system, are moved to inside the second transformed drawing area 47 in the drawing-coordinate-system. In the rotation shift, the photographing-coordinate-system is shifted by an inclining angle "θ", that is the angle between the X-axis in the drawing-coordinate-system and an X'-axis in the photographing-coordinate-system. In this shift from the quadrangle 49 to the second transformed drawing area 47, the shifting-amount is determined so that one of the vertexes of the quadrangle 49 corresponds to the origin "O" of the drawing-coordinate-system. In this case, the point $Q_1$ representing the position of the second alignment mark $M_2$ in the photographing-coordinate-system, corresponds to the origin "O" of the drawing-coordinate-system after movement. Therefore, the point $Q_2$, that is one of the vertexes of the second transformed drawing area 47, corresponds to the origin "O".

When the coordinate system values of the origin "O'" of the photographing-coordinate-system are $(X_0, Y_0)$ in the drawing-coordinate-system, the amount of parallel shift after the rotation shift, is "$-X_0$" for the X-axis direction, and "$-Y_0$" for the Y-axis direction. Based on the above, the point $P_1$ $(X_{11}, Y_{11})$ representing the position of the first alignment mark $M_1$ in the photographing-coordinate-system, is moved to the point $P_2$ $(X_{12}, Y_{12})$ in the drawing-coordinate-system, as represented by formulas (1) and (2). Applying these operational processes of the formulas (1) and (2), all points included in the quadrangle 49 of the photographing-coordinate-system are moved to inside the second transformed drawing area 47, that is, the quadrangle 49 is converted to the second transformed drawing area 47.

$$X_{12} = (X_{11} \times \cos\theta - Y_{11} \times \sin\theta) - X_0 \tag{1}$$

$$Y_{12} = (X_{11} \times \sin\theta + Y_{11} \times \cos\theta) - Y_0 \tag{2}$$

As explained above, the coordinate system values of the vertexes of the second transformed drawing area 47 in the drawing-coordinate-system are calculated based on information on the positions of the first to fourth alignment marks $M_1$ to $M_4$ in the photographing-coordinate-system, and the mark position data representing the actual positions of the first to fourth alignment marks $M_1$ to $M_4$ in the drawing-coordinate-system, are generated.

Figure 7:
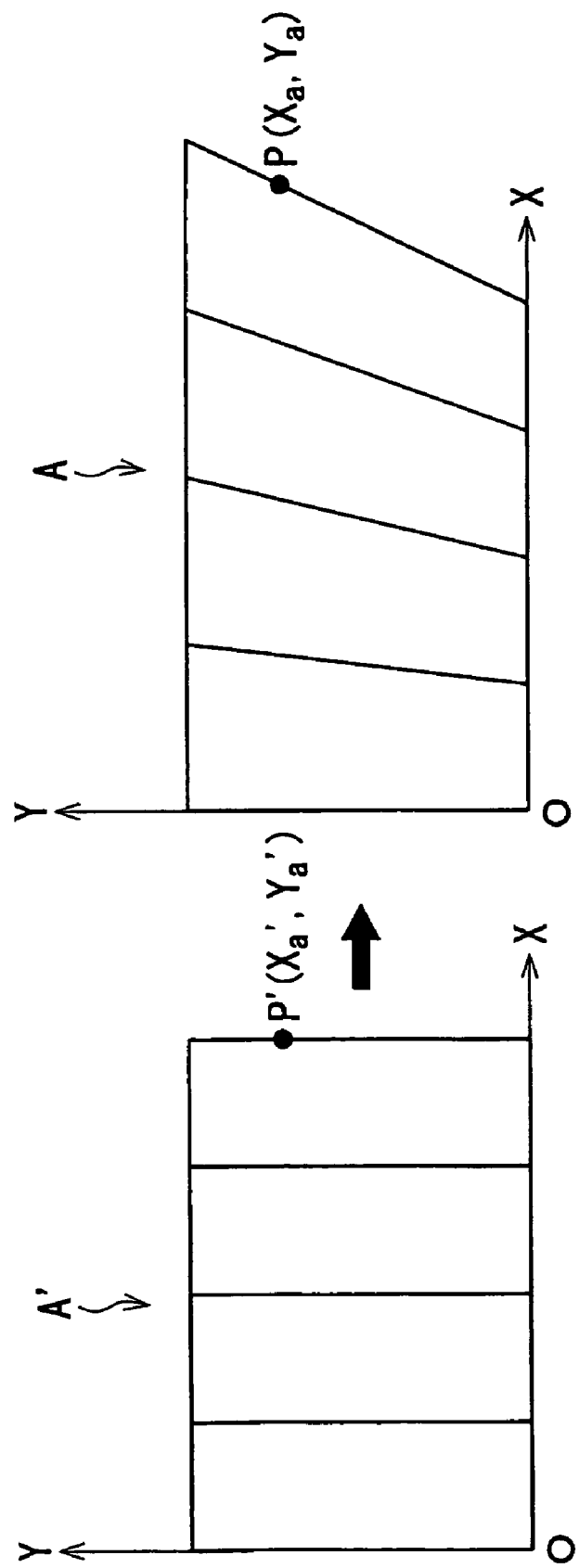
FIG. 7 is a conceptual view of a gradual scaling.

The gradual scaling is a conversion of a point in the two-dimensional coordinate system to another point, whose coordinate system value is calculated by adding a value in proportion to one of the X and Y coordinate system values, to another one of the X and Y coordinate system values of the point to be converted. In an example of gradual scaling shown in FIG. 7, an arbitrary point P' $(X_a', Y_a')$ included in a diagram A' whose one vertex corresponds to the origin "O", is converted to the point P $(X_a, Y_a)$ whose coordinate system values are represented by formulas (3) and (4). Due to carrying out the gradual scaling, the diagram A' is converted to the diagram A. Note that "α" in formula (3), is a coefficient of proportion in the X-axis direction.

$$X_a = (1 + \alpha \times Y_a') \times X_a' \tag{3}$$

$$Y_a = Y_a' \tag{4}$$

Figure 8:
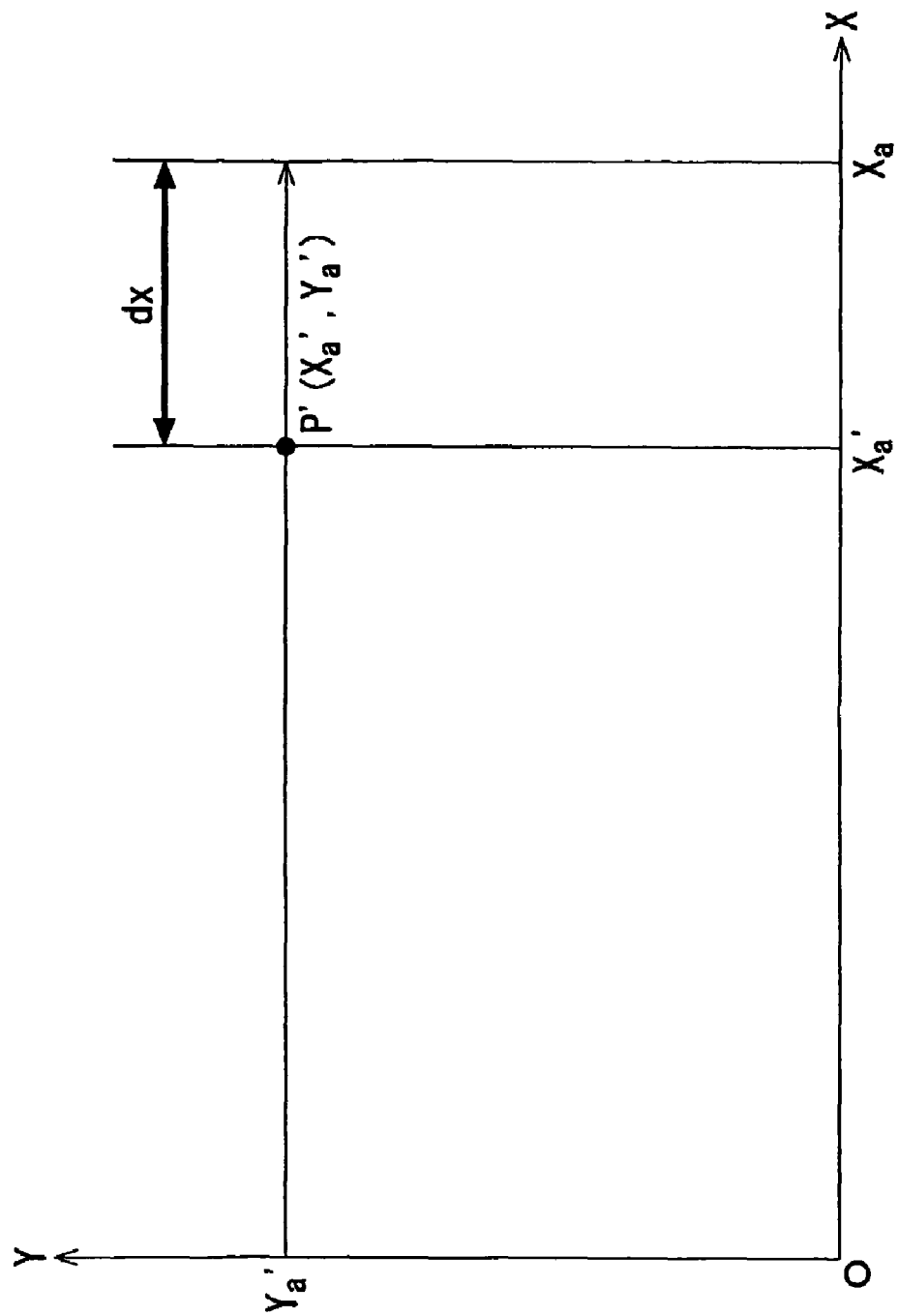
FIG. 8 is a view representing a moving amount of a point when the gradual scaling is carried out in an X-axis direction.

Next, the gradual scaling for both X-axis and Y-axis directions is explained. When the gradual scaling is carried out for the X-axis direction (see FIG. 8), an arbitrary point P' $(X_a', Y_a')$ is moved to the point P whose X coordinate system value is "$X_a$" represented by formula (3), therefore, the shifting amount "dx" in the X-axis direction, is represented by formula (5).

$$dx = X_a - X_a' = (1 + \alpha \times Y_a') \times X_a' - X_a' = \alpha \times X_a' \times Y_a' \tag{5}$$

Figure 9:
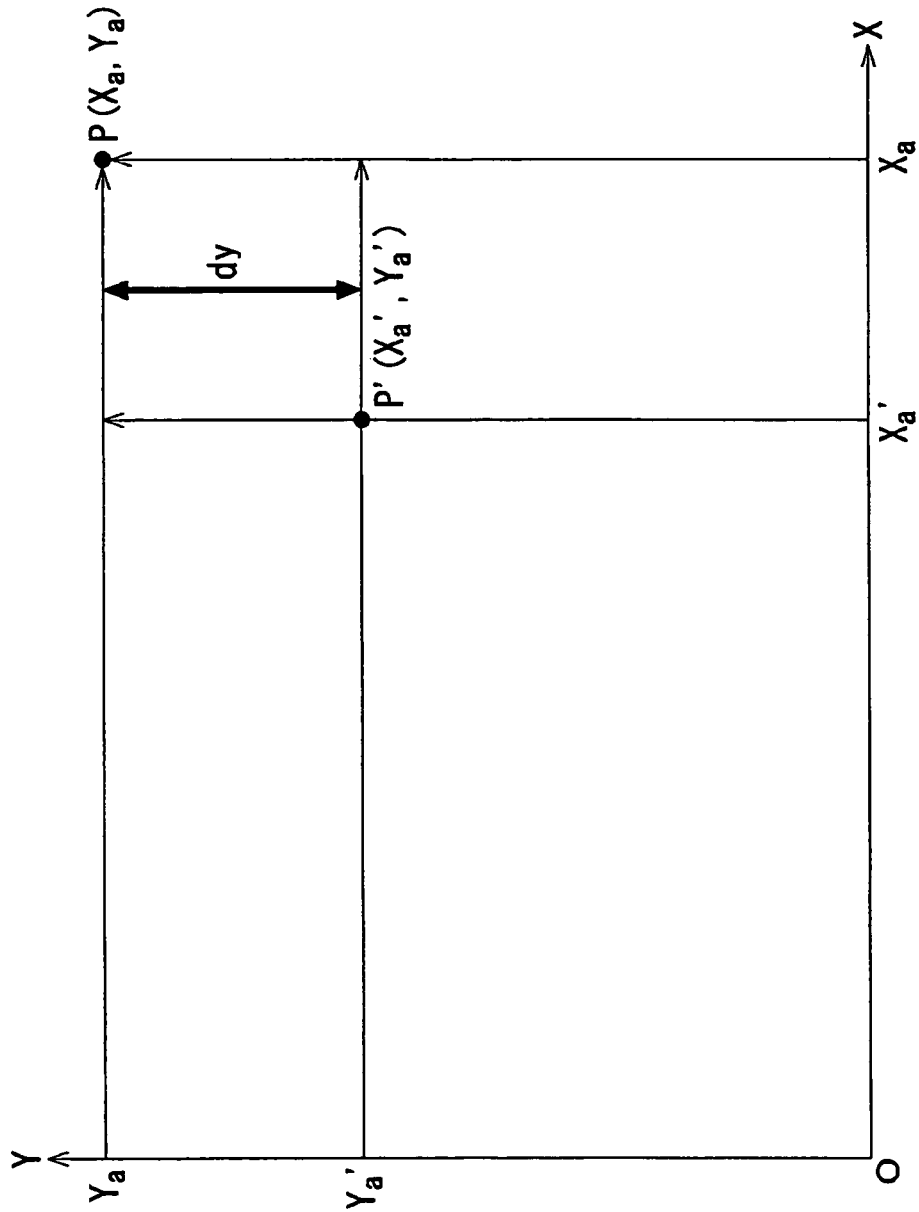
FIG. 9 is a view representing a moving amount of a point when the gradual scaling is carried out in a Y-axis direction.

Further, when the gradual scaling is also carried out for the Y-axis direction (see FIG. 9), a Y coordinate system value "$Y_a$" of the point P which is a point after movement from the arbitrary point P' $(X_a', Y_a')$, is represented by formula (6), and then, the shifting amount "dy" in the Y-axis direction, is calculated by formula (7), similarly to the X-axis direction. The "β" in formulas (6) and (7), is a coefficient of proportion of the Y-axis direction.

$$Y_a = (1 + \beta \times X_a') \times Y_a' \quad (6)$$

$$dy = Y_a - Y_a' = (1 + \beta \times X_a') \times Y_a' - Y_a' = \beta \times X_a' \times Y_a' \quad (7)$$

Figure 10:
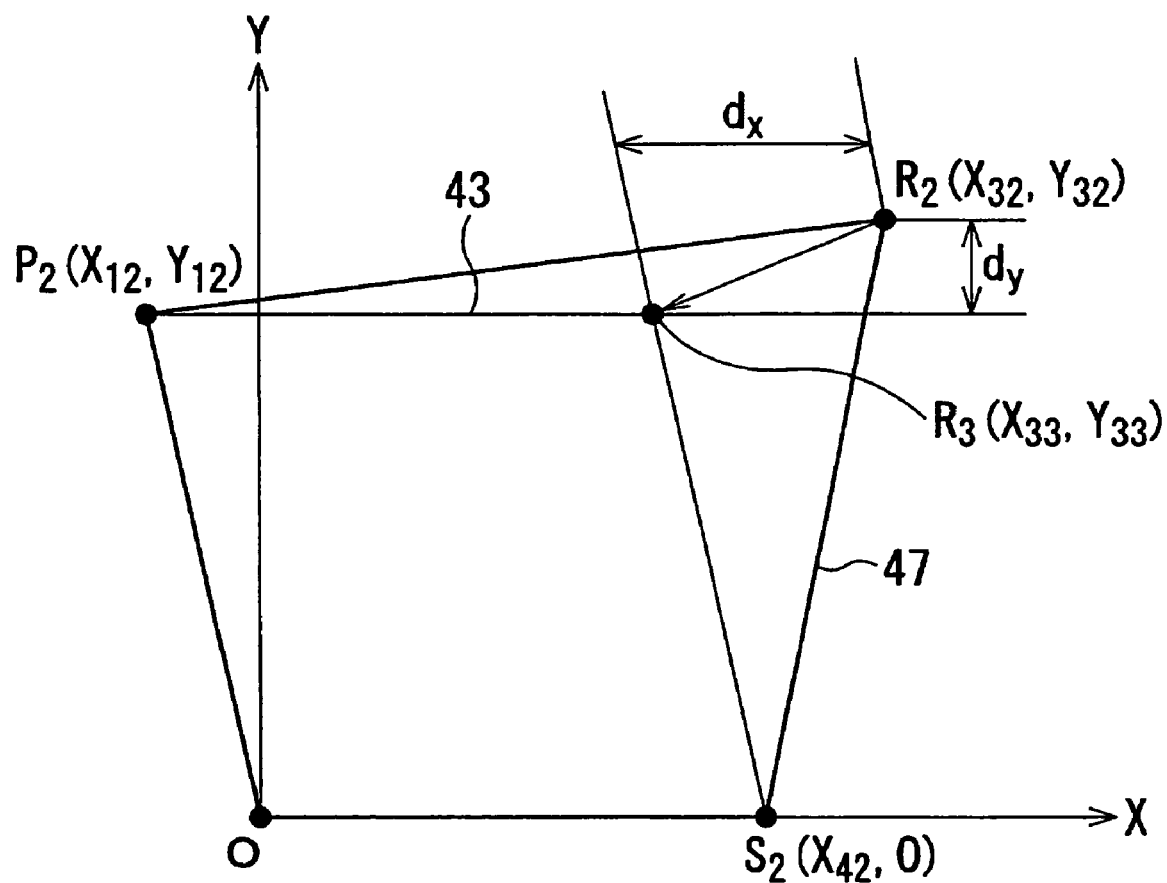
FIG. 10 is a conceptual view representing a conversion of a second transformed drawing area to a first transformed drawing area by a gradual scaling correction method.

In this embodiment, in the correction method based on the gradual scaling in the drawing-coordinate-system, the second transformed drawing area 47 being a simple quadrangle, is converted to the first transformed drawing area 43 which is a parallelogram having two neighboring sides that are the same as two neighboring sides of the second transformed drawing area 47, and having a shape closer to the ideal drawing area 41 than the second transformed drawing area 47 (see FIG. 10). That is, the second transformed drawing area 47, having vertexes of the point $P_2$ ($X_{12}, Y_{12}$), the origin "O" (0,0), the point $R_2$ ($X_{32}, Y_{32}$), and the point $S_2$ ($X_{42}$, 0), is converted to the first transformed drawing area 43 having a vertex of the point $R_3$ ($X_{33}, Y_{33}$) instead of the point $R_2$ ($X_{32}, Y_{32}$).

In this conversion, the coefficients of proportion "$\alpha$" and "$\beta$" should be calculated. The coefficients of proportion "$\alpha_1$" and "$\beta_1$," in this case, are represented by formulas (8) and (9) using the coordinate system values of the vertexes of the second transformed drawing area 47, similarly to the formulas (5) and (7).

$$\alpha_1 = dx/(X_{42} \times Y_{12}) = (X_{33} \times X_{32})/(X_{42} \times Y_{12}) \quad (8)$$

$$\beta_1 = dy/(X_{42} \times Y_{12}) = (Y_{33} - Y_{32})/(X_{42} \times Y_{12}) \quad (9)$$

All of the points included in the second transformed drawing area 47 are moved to the first transformed drawing area 43, by the gradual scaling correction method using the calculated coefficients of proportion "$\alpha_1$" and "$\beta_1$". That is, the second transformed drawing area 47 is converted to the first transformed drawing area 43.

Figure 11:
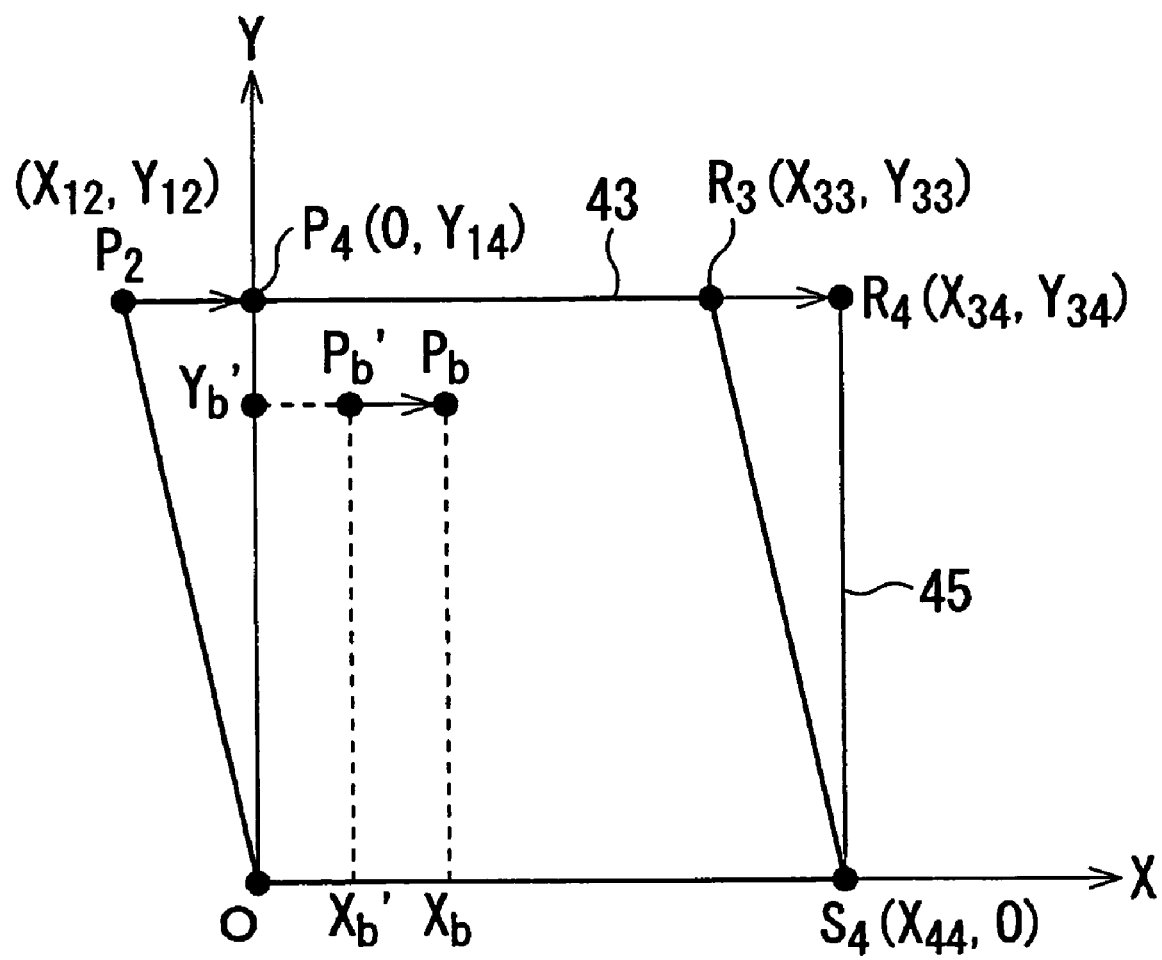
FIG. 11 is a conceptual view representing a conversion of the first transformed drawing area to a scale changed drawing area.

As shown in FIG. 11, the first transformed drawing area 43 which is a parallelogram, is converted to the scale changed drawing area 45 which has at least one side that is the same as a side of the first transformed drawing area 43, and has a shape closer to the ideal drawing area 41 than the first transformed drawing area 43. That is, the first transformed drawing area 43, having vertexes of the point $P_2$ ($X_{12}, Y_{12}$), the origin "O" (0,0), the point $R_3$ ($X_{33}, Y_{33}$), and the point $S_4$ ($X_{44}$, 0), is converted by the sloping correction method, to the scale changed drawing area 45 having vertexes of the point $P_4$ (0,$Y_{14}$), the origin "O" (0,0), the point $R_4$ ($X_{34}, Y_{34}$), and the point $S_4$ ($X_{44}$,0). Note that the conversion of the point $S_2$ to the point $S_4$, is only a change in the notation, and the coordinate values of $X_{42}$ and $X_{44}$ are the same values.

In this conversion, an incline "$\gamma$" of the side connecting the origin "O" and the point $P_2$, represented by formula (10) is used. That is, all of the points in the first transformed drawing area 43, are moved parallel to the X-axis by the moving amount in proportion to the Y coordinate system value of each point to be moved. In this case, an arbitrary point $P_b'$ ($X_b', Y_b'$) is moved to the point Pb having the coordinate system values "$X_b$" and "$Y_b$" represented by formulas (11) and (12)

$$\gamma = Y_{12}/X_{12} \quad (10)$$

$$X_b = X_b' + \gamma \times Y_b' \quad (11)$$

$$Y_b = Y_b' \quad (12)$$

In the operation represented by formulas (10) to (12), all points in the first transformed drawing area 43 are moved to be included in the scale changed drawing area 45, for example, the point $P_2$ ($X_{12}, Y_{12}$) is moved to the point $P_4$ (0,$Y_{14}$), and the point $R_3$ ($X_{33}, Y_{33}$) is moved to the point $R_4$ ($X_{34}, Y_{34}$). That is, the first transformed drawing area 43 is converted to the scale changed drawing area 45.

Figure 12:
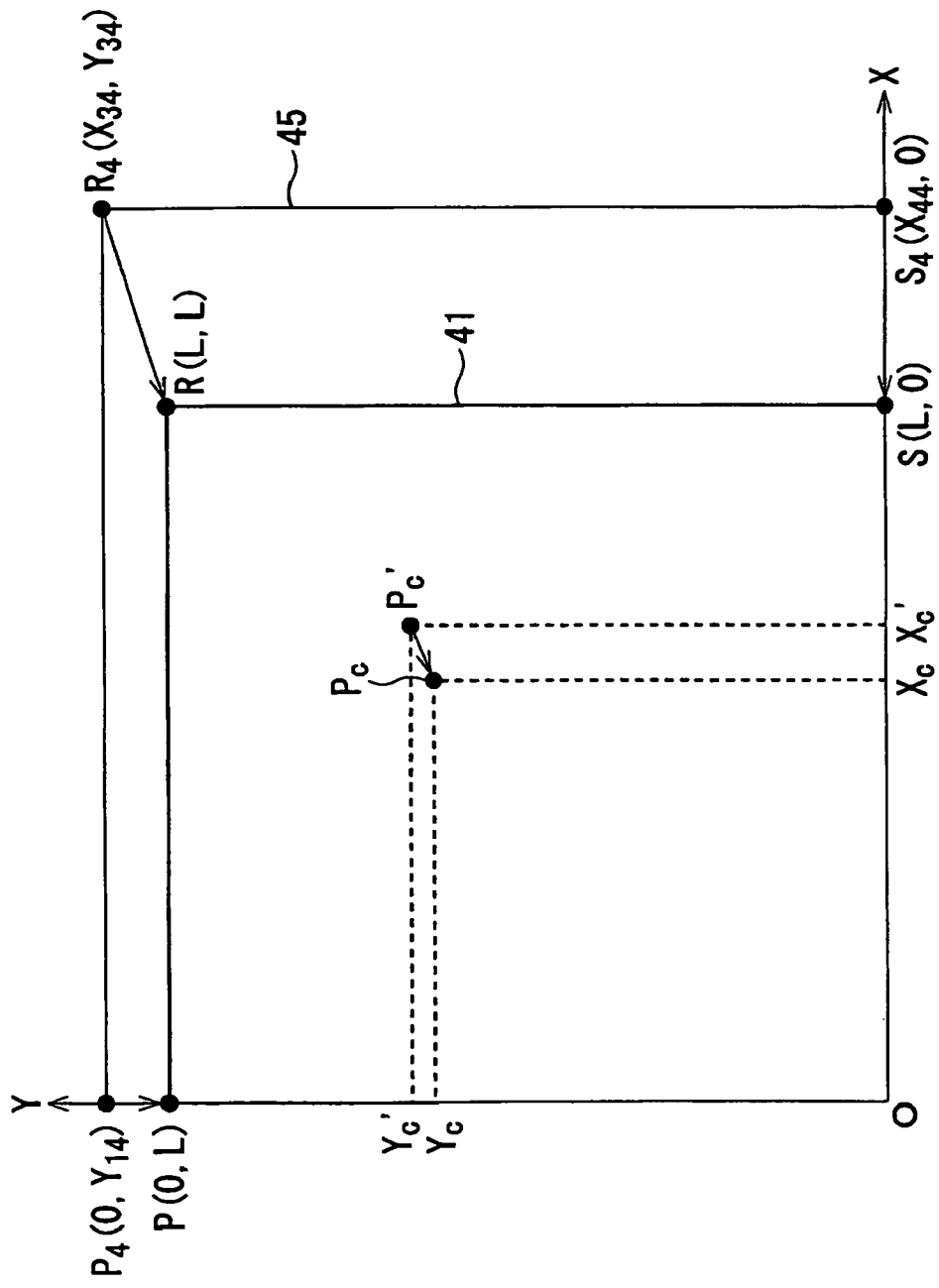
FIG. 12 is a conceptual view representing a conversion of the scale changed drawing area to an ideal drawing area.

The rectangle scale changed drawing area 45 is converted to the ideal drawing area 41 having at least one side that is the same as the side of the scale changed drawing area 45, by the scaling correction method (see FIG. 12). That is, the scale changed drawing area 45, having vertexes of the point $P_4$ (0,$Y_{14}$), the origin "O" (0,0), the point $R_4$ ($X_{34}, Y_{34}$), and the point $S_4$ ($X_{44}$,0), is converted to the ideal drawing area 41 which has sides being a part of the sides of the drawing area 45 on the X-axis and the Y-axis. In this case, the length "L" of a side of the ideal drawing area 41, equals a distance between the neighboring alignment marks $M_1$ to $M_4$ being in the ideal positions on the substrate 40 without any transformation, represented by the original drawing data.

The coordinate system values of the point $P_c$ ($X_c, Y_c$), being moved from an arbitrary point $P_c'$ ($X_c', Y_c'$) included in the drawing area 45, by the scaling correction method are represented by formulas (13) and (14).

$$X_c = X_c' \times (L/X_{44}) \quad (13)$$

$$Y_c = Y_c' \times (L/Y_{14}) \quad (14)$$

In the operation represented by formulas (13) and (14), all of the points in the scale changed drawing area 45 are moved to be included in the ideal drawing area 41, for example, the point $P_4$ (0,$Y_{14}$) is moved to the point P (0,L), and the point $S_4$ ($X_{44}$,0) is moved to the point S (L,0). That is, the scale changed drawing area 45 is converted to the ideal drawing area 41.

Based on the successive operations for converting the second transformed drawing area 47 to the ideal drawing area 41, the drawing data is corrected. That is, the operations explained above corresponding to all formulas except for formulas (3) to (7), are carried out in reverse order, and the original drawing data is converted to the first corrected drawing data corresponding to the first transformed drawing area 43 via the corrected drawing data corresponding to the scale changed drawing area 45, and finally, the first corrected drawing data is converted to the second corrected drawing data for drawing patterns in the second transformed drawing area 47.

As explained above, in the embodiment, in the case where the drawing area is transformed to a simple quadrangle, not to a parallelogram or a trapezoid, when the substrate 40 has been complicatedly transformed, the drawing data is accurately corrected in accordance with the transformation of the substrate 40 by the control device 50.

The shape of the drawing area is not limited to be a square in the embodiment, for example, it can be a rectangle, or an arbitrary quadrangle, because the drawing data can be corrected in accordance with the transformation of the substrate 40, that is the transformation of the ideal drawing area 41. Further, instead of the first to fourth alignment marks $M_1$ to $M_4$, holes for aligning pattern positions can be provided in the substrate 40.

The outline and the size of the drawing area can be measured without the first to fourth alignment marks $M_1$ to $M_4$, for example in the case where the whole surface of the substrate 40 is a drawing area. In this case, the positions of the corners of the substrate 40 and so on, are detected by the first and second CCD cameras 32 and 34.

Finally, it will be understood by those skilled in the art that the foregoing description is of the preferred embodiment of the method and apparatus, and that various changes and modifications may be made to the present invention without departing from the spirit and scope thereof.

The present disclosure relates to subject matters contained in Japanese Patent Application No. 2005-120756 (filed on Apr. 19, 2005) which is expressly incorporated herein, by reference, in its entirety.

The invention claimed is:

1. A data correcting apparatus for correcting drawing data representing a drawing pattern to be drawn in a quadrangular drawing area of a drawing subject, comprising:
   an ideal position determiner that determines an ideal position of said quadrangular drawing area based on a position of said quadrangular drawing area before said drawing subject is transformed, wherein an ideal outline is an outline of said quadrangular drawing area in said ideal position;
   an actual position determiner that determines an actual position of said quadrangular drawing area based on the position of said quadrangular drawing area after said drawing subject is transformed, wherein an actual outline is an outline of said quadrangular drawing area in said actual position;
   a first data corrector that corrects said drawing data to be first corrected drawing data, where a first corrected outline, comprising an outline of said drawing area represented by said first corrected drawing data, is a parallelogram which has two neighboring sides that are the same as two neighboring sides of said actual outline, one of said two neighboring sides of said corrected first outline overlapping a side of said ideal outline.

2. The data correcting apparatus according to claim 1, wherein said first data corrector corrects said drawing data based on ideal positions and actual positions of marks provided on said drawing subject, said marks representing vertexes of said drawing area.

3. The data correcting apparatus according to claim 1, further comprising a second data corrector that corrects said first corrected drawing data to be second corrected drawing data, where a second corrected outline being an outline of said drawing area represented by said second corrected drawing data is said actual outline.

4. The data correcting apparatus according to claim 1, further comprising a third data corrector that corrects said drawing data to be third corrected drawing data, where a third corrected outline, comprising an outline of said drawing area represented by said third corrected drawing data, is a rectangle which has at least one side that is the same as a side of said parallelogram.

5. The data correcting apparatus according to claim 1, wherein said first data corrector is configured to correct said drawing data to be first corrected drawing data by converting a two-dimensional coordinate system value of said drawing data to a corrected two-dimensional coordinate system value of said first corrected drawing data by adding a value in proportion to one of said two-dimensional coordinate system values of said drawing data to another of said two-dimensional coordinate system values of said drawing data.

6. A drawing apparatus, comprising:
   a data corrector that corrects drawing data representing a drawing pattern to be drawn in a quadrangular drawing area of a drawing subject, based on an ideal position and an actual position of said drawing area on said drawing subject, wherein said ideal position is a position of said drawing area before said drawing subject is transformed and said actual position is a position of said drawing area after said drawing subject is transformed, an actual outline being an outline of said drawing area in said actual position, and an ideal outline being an outline of said drawing area in said ideal position, said data corrector corrects said drawing data to be corrected drawing data, wherein a corrected outline, comprising an outline of said drawing area represented by said corrected drawing data, is a parallelogram which has two neighboring sides that are the same as two neighboring sides of said actual outline, one of said two neighboring sides of said corrected outline overlapping a side of said ideal outline; and
   a pattern drawer that draws said drawing pattern based on said corrected drawing data.

7. The drawing apparatus according to claim 6, wherein said data corrector corrects said drawing data based on ideal positions and actual positions of marks provided on said drawing subject, said marks representing vertexes of said drawing area.

8. The drawing apparatus according to claim 7 further comprising a mark position detector that detects said actual positions of said marks.

9. The drawing apparatus according to claim 8, further comprising a mark data generator that generates mark position data representing said actual positions of said marks,
   wherein said data corrector corrects said drawing data based on said mark position data.

10. The drawing apparatus according to claim 9, wherein said mark data generator generates said mark position data representing said actual positions of said marks in a coordinate system of said pattern drawer, based on said actual positions of said marks in a coordinate system of said mark position detector.

11. The drawing apparatus according to claim 6, wherein said data corrector is configured to correct said drawing data to be corrected drawing data by converting a two-dimensional coordinate system value of said drawing data to a corrected two-dimensional coordinate system value of said corrected drawing data by adding a value in proportion to one of said two-dimensional coordinate system values of said drawing data to another of said two-dimensional coordinate system values of said drawing data.

12. A drawing data correcting method for correcting drawing data representing a drawing pattern to be drawn in a quadrangular drawing area of a drawing subject, comprising:
   determining, with a computer, an ideal position of the quadrangular drawing area based on a position of the quadrangular drawing area before the drawing subject is transformed, wherein an ideal outline is an outline of the quadrangular drawing area in the ideal position;
   determining, with a computer, an actual position of the quadrangular drawing area based on a position of the quadrangular drawing area after the drawing subject is transformed, wherein an actual outline is an outline of the quadrangular drawing area in the actual position;
   correcting, with a computer, the drawing data to be corrected drawing data, wherein a corrected outline, comprising an outline of the quadrangular drawing area represented by the corrected drawing data, is a parallelogram which has two neighboring sides that are the same as two neighboring sides of said actual outline, one of the two neighboring side of the corrected outline overlapping a side of the ideal outline.

13. The drawing data correcting method according to claim 12, wherein the correcting includes converting a two-dimensional coordinate system value of the drawing data to be a corrected two-dimensional coordinate system value of the corrected drawing data by adding a value in proportion to one of the two-dimensional coordinate system values of the drawing data to another of the two-dimensional coordinate system values of the drawing data.

14. A storage device that stores a program executable by a computer for correcting drawing data representing a drawing pattern to be drawn in a quadrangular drawing area of a drawing subject, the storage device comprising:

an ideal position determining code segment that determines an ideal position of the quadrangular drawing area based on a position of the quadrangular drawing area before the drawing subject is transformed, wherein an ideal outline is an outline of the quadrangular drawing area in the ideal position;

an actual position determining code segment that determines an actual position of the quadrangular drawing area based on a position of the quadrangular drawing area after the drawing subject is transformed, wherein an actual outline is an outline of the quadrangular drawing area in the actual position; and a data corrector code segment that corrects the drawing data to be corrected drawing data, where a corrected outline, comprising an outline of the quadrangular drawing area represented by the corrected drawing data, is a parallelogram which has two neighboring sides that are the same as two neighboring sides of the actual outline, one of the two neighboring sides of the corrected outline overlapping a side of the ideal outline.

15. The storage device according to claim 14, wherein said data corrector code segment corrects the drawing data to be corrected drawing data by converting a two-dimensional coordinate system value of the drawing data to a corrected two-dimensional coordinate system value of the corrected drawing data by adding a value in proportion to one of the two-dimensional coordinate system values of the drawing data to another of the two-dimensional coordinate system values of the drawing data.

16. A drawing data correcting method for correcting drawing data representing a drawing pattern to be drawn in a quadrangular drawing area of a drawing subject, the method comprising:

determining, with a computer, an ideal position of the quadrangular drawing area based on a position of the drawing area before the drawing subject is transformed, an ideal outline being an outline of the drawing area in the ideal position, original drawing data corresponding to the ideal outline;

determining, with a computer, an actual position of the drawing area based on a position of the drawing area after the drawing subject is transformed, an actual outline being an outline of the drawing area in the actual position;

calculating, with a computer, a second transformed drawing area outline based on the actual outline by converting coordinates of the actual outline so that a vertex of the actual outline corresponds to an origin of a drawing-coordinate system;

calculating, with a computer, an x-axis scaled drawing area outline based on the second transformed drawing area outline by gradually scaling the second transformed drawing area outline in an x-axis direction of the drawing-coordinate system;

calculating, with a computer, a first transformed drawing area outline based on the x-axis scaled drawing area outline by gradually scaling the x-axis scaled drawing area outline in the x-axis direction and in a y-axis direction of the drawing-coordinate system;

calculating, with a computer, a scale changed drawing data based on the original drawing data by scaling the original drawing data to correspond to a scale of the first transformed drawing area outline;

calculating, with a computer, a first corrected drawing data based on the scale changed drawing data by applying a sloping correction method to the scale changed drawing data so that the first corrected drawing data corresponds to the first transformed drawing area outline; and calculating, with a computer, a second corrected drawing data based on the first corrected drawing data by applying a gradual scaling correction method to the first corrected drawing data so that the second corrected drawing data corresponds to the second transformed drawing area outline, the first transformed drawing area outline being a parallelogram with two neighboring sides that are the same as two neighboring sides of the actual outline, with one of the two neighboring sides of the first transformed drawing area outline overlapping a side of the ideal outline, and the second transformed drawing area outline being congruent with the actual outline.

* * * * *